Jan. 22, 1957     A. G. VANDERPOEL     2,778,892
ATMOSPHERIC TIMING CONTROL
Filed Nov. 7, 1952
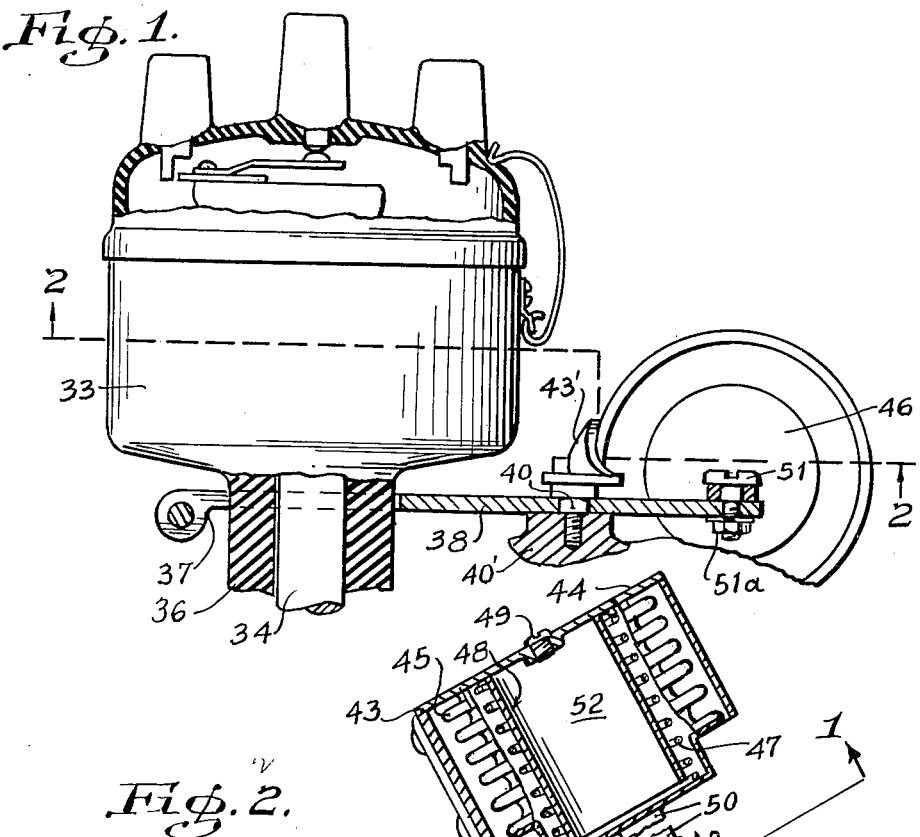
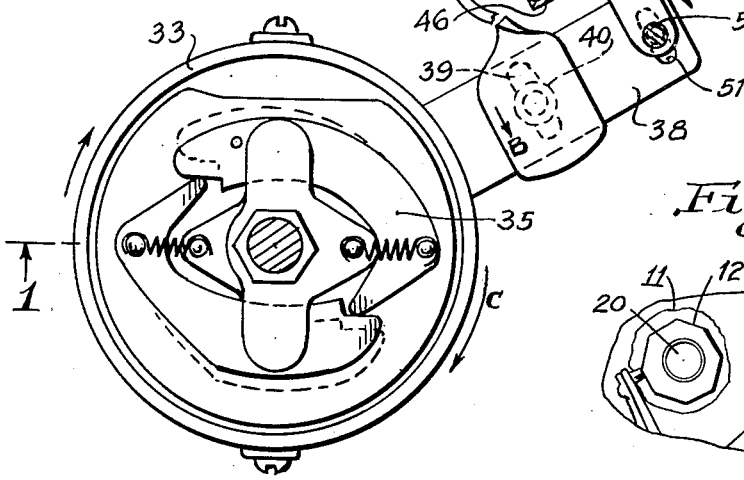
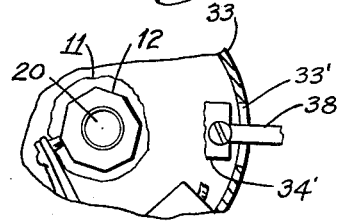
INVENTOR.
ALBERT G. VANDERPOEL
By Philip Subkow
ATTORNEY.

2,778,892

ATMOSPHERIC TIMING CONTROL

Albert G. Vanderpoel, Los Angeles, Calif.

Application November 7, 1952, Serial No. 319,333

3 Claims. (Cl. 200—31)

This invention relates to automatic spark timing control in which the spark advance, in addition to being automatically responsive to engine speed and load or throttle setting, is also responsive to variations in atmospheric air density.

Automatic spark advance devices are known and widely used in which the spark is automatically advanced or retarded responsive to engine speed and load or throttle setting. Some such devices employ pneumatic means solely, whereby the spark is advanced or retarded due to changes in pressure in the air fuel induction system of the engine, as the engine speed and load change, and in others the spark is adjusted by mechanical means such as a governor which is responsive to engine speed and in others by a combination of such pneumatic and mechanical means.

In all such devices it is the load or throttle setting and engine speed which govern the spark setting. However, there is another variable which affects engine performance and the spark advance demand of an engine in addition to load and speed. When the spark advance is adjusted to follow a desired demand for various engine speeds at a given atmospheric pressure, for example, sea level, the spark advance thus obtained at various engine speeds and loads will be insufficient as the atmospheric pressure decreases. This phenomenon is also important in case of supercharged engines where an increase in the pressure of the air fed to the air intake will require for maximum performance a retardation of the spark over the advance desirable and ordinary atmospheric pressures for like engine speeds, throttle and choke settings.

The reduction in air density as a result of reduction in air pressure has the same effect as the lowering of compression ratio and supercharging has an effect similar to increasing the compression ratio. Thus in the latter case the rate of combustion of the fuel in the combustion chamber is increased while in the former it is reduced. By advancing the spark as the air density decreases or retarding the spark as air density increases the completion of combustion of the fuel at the proper time in the cycle is assured and maximum economy assured.

It is thus an object of my invention to automatically advance or retard the spark as the density of the air fed to the carburetor decreases or retards the spark as the density increases.

The automatic advance response to changes in atmospheric pressure and air density described herein may be applied without employing the prior art devices for automatic advance responsive to engine speed or load or may be applied in addition thereto, and may be applied to the pneumatic type, the mechanical type or the combined pneumatic and mechanical type of automatic spark advance.

These and other objects of my invention will be further described in connection with the drawings, in which:

Fig. 1 is a vertical view of the application of my invention to a mechanically operated spark advance mechanism, shown partly in elevation and partly in section, and taken on line 1—1 of Fig. 2;

Fig. 2 is a section taken on line 2—2 of Fig. 1, shown partly in plan;

Fig. 3 is a fragmentary section of the modification of Fig. 1.

Figs. 1 and 2 illustrate the application of the invention to a conventional centrifugal governor controlled advance mechanism. The case 33 carries the conventional governor 35 shown in full lines in the retard position with the dotted lines showing the weights shown in spark advance position. The breaker plate, breaker and cam driven by cam drive shaft 34, which is in turn rotated by the engine, are not shown in detail since this is a conventional construction. As is well known in such devices the breaker plate is connected to the case 33 and by rotation of the case the initial advance setting for the distributor can be effected. The centrifugal governor rotates the cam relative to the drive shaft to advance the spark. Such a device is illustrated and described in "Internal Combustion Engines," by Jennings and Obert, 1944 ed., pp. 382 to 386, inc. As explained in this work such spark timing mechanisms are responsive only to engine speed and not responsive to manifold vacuum generated by the engine. See pages 386 and 387 of the cited work.

I modify this conventional construction by connecting the case to my atmospheric pressure controlled advance mechanism.

A clamp 37 at the end of arm 38 is connected outside the case extension 36 in which the cam shaft 34 is mounted. The breaker cam rotates with the shaft as is conventional for such governor controlled spark advance mechanisms. The arm 38 carries an arcuate slot 39 through which passes a pin 40 secured rigidly to some fixed point 40' in the engine block or chassis of the car. To the pin 40 is rigidly connected a bracket arm 43' on which is mounted the open bottomed case 43 to the top 44 of which is connected a bellows 45 carrying a rigid base 46. The top 44, base 46 and bellows 45 make a chamber 52 which is sealed by plug 49. Depending from the top 44 is a sleeve 48 and placed between the bottom 46 and top 44 is a spring 47. The bottom 46 is connected to an arm 50 pivoted in the end of the arm 38 at a pivot 51.

While I have shown a mechanism whereby the centrifugal governor rotates the breaker plate, a similar result may be obtained by connecting the arm 38 to the breaker plate of a magneto type timing device, as will be understood by those skilled in this art.

The desired pressure is sealed in 52 by plug 49, for example, a vacuum. This together with the spring 47 balances the air pressure on the outside of the bellows 45. The arm 50 is adjusted by positioning the pivot 51 in the slot 51' for the initial setting of the advance and locking in place by the nut 51a. This holds the arm 38 in position so that the desired advance setting is obtained when the shaft 34 is not rotating, i. e., when the engine is not operating. This position of the arms and consequently of the case 33 is maintained when the pressure of the atmosphere does not change. The advance or retard caused by the governor 35 is superimposed on the advance setting caused by the bellows 45. As the atmospheric pressure and the density of the air decrease, the arm 50 moves in the direction of the arrow A. Since the pin 40 and the shaft 34 have a fixed relation, the arm 38 moves in the direction as shown by arrow B, causing the case to rotate in the direction of the arrow C. As will be well understood by those skilled in this art, this movement causes the breaker plate to rotate about the axis of the shaft 34 and to advance the spark. As previously indicated this advance caused by the reduction in atmospheric pressure is added to the degree of the advance caused by the motion of the weights of the governor 35 in the direction shown by the arrow C under influence of engine speed.

Instead of connecting the plate to the case and rotating the case by the arm 38, the arm may pass through an axial slot 33' in the case and rotate the plate in the case, as will be understood by those skilled in the art, as shown in Fig. 3, where the arm 38 passes through slot 33' in case 11 and connects to the breaker plate 33'. In all other respects the construction is the same as in the form shown in Figs. 1 and 2. The plate 11 is rotated about the cam shaft 20 and cam 12 in the same manner as if rotated by the case.

In all of the devices described above, the spark is advanced responsive to operational conditions of the engine, i. e., load, throttle, setting, and engine speed, and independently by a separate means responsive to atmospheric pressure. The second means cooperates with the first means to cause the desired spark advance and timing.

While I have described a particular embodiment of my invention for the purpose of illustration, it should be understood that various modifications and adaptations thereof may be made within the spirit of the invention as set forth in the appended claims.

I claim:

1. A spark timing mechanism comprising a cam, a cam drive shaft, a centrifugal spark advance mechanism for adjusting the angular disposition of said cam on said cam shaft, a breaker plate, means for adjusting the angular relation of said breaker plate about said shaft, said means including an arm, a motion transmitting connection between said arm and said plate, a sealed diaphragm chamber, a diaphragm plate sealing said chamber, one side of said diaphragm being adjacent the interior of said chamber, the other side of said diaphragm being exposed to atmospheric pressure, and a connection between said arm and said diaphragm.

2. A spark timing mechanism comprising a case containing a cam, a cam drive shaft, a centrifugal spark advance mechanism for adjusting the angular disposition of said cam on said cam shaft, and a breaker plate, means mounted exteriorly of said case for adjusting the angular relation of said breaker plate about said shaft, said means including an arm connected to said plate, a sealed diaphragm chamber, a diaphragm plate sealing said chamber, one side of said diaphragm being adjacent the interior of said chamber, the other side of said diaphragm being exposed to atmospheric pressure, and a connection between said arm and said diaphragm.

3. A spark timing mechanism comprising a rotatable case containing a cam, a cam drive shaft, a centrifugal spark advance mechanism for adjusting the angular disposition of said cam on said cam shaft, and a breaker plate fixed with respect to said case, means mounted exteriorly of said case for adjusting the angular relation of said breaker plate about said shaft, said means including an arm connected to said case, a sealed diaphragm chamber, a diaphragm plate sealing said chamber, one side of said diaphragm being adjacent the interior of said chamber, the other side of said diaphragm being exposed to atmospheric pressure, and a connection between said arm and said diaphragm.

References Cited in the file of this patent

UNITED STATES PATENTS

| | | |
|---|---|---|
| 1,354,888 | Conklin | Oct. 5, 1920 |
| 1,825,388 | Fitzsimmons | Sept. 29, 1931 |
| 1,978,380 | Ehrlich | Oct. 23, 1934 |
| 2,093,524 | Meade | Sept. 21, 1937 |
| 2,107,266 | Arthur | Feb. 8, 1938 |
| 2,383,898 | Udale | Aug. 28, 1945 |
| 2,470,366 | Ostling | May 17, 1949 |
| 2,640,116 | Dyer et al. | May 26, 1953 |
| 2,646,781 | Doyen | July 28, 1953 |
| 2,731,523 | Downing | Jan. 17, 1956 |